United States Patent [19]
Fenzel

[11] Patent Number: 4,541,516
[45] Date of Patent: Sep. 17, 1985

[54] CLUTCH DRIVE WITH ANTIROTATION SPRING

[75] Inventor: David T. Fenzel, Grafton, Ohio

[73] Assignee: Allied Corporation, Morristown, N.J.

[21] Appl. No.: 473,427

[22] Filed: Mar. 9, 1983

[51] Int. Cl.[4] .................. F16D 13/30; F16D 25/08
[52] U.S. Cl. .................... 192/85 CA; 192/91 A; 192/110 B
[58] Field of Search .............. 192/66, 85 CA, 91 A, 192/106.1, 106.2, 110 B; 92/116, 129; 188/170; 464/61, 62, 65

[56] References Cited

U.S. PATENT DOCUMENTS

| | | | |
|---|---|---|---|
| 2,104,962 | 1/1938 | Anderson | 192/106.2 |
| 2,308,681 | 1/1943 | Eason | 192/66 |
| 2,684,742 | 7/1954 | Eason | 192/91 A |
| 3,145,816 | 8/1964 | De Lorean et al. | 192/91 A |
| 3,467,071 | 9/1969 | Elmer | 123/41.12 |
| 3,684,397 | 8/1972 | Elmer | 416/39 |
| 3,757,914 | 9/1973 | Elmer | 192/48.3 |
| 3,777,866 | 12/1973 | Elmer | 192/91 A |
| 3,985,214 | 10/1976 | Hall et al. | 192/91 A |
| 4,226,095 | 10/1980 | Loken | 64/27 CT |
| 4,283,009 | 8/1981 | Deem | 236/86 |
| 4,353,444 | 10/1982 | Bionaz | 192/70.18 |
| 4,355,710 | 10/1982 | Schilling | 192/91 A |

FOREIGN PATENT DOCUMENTS 2109888  6/1983  United Kingdom .

Primary Examiner—Rodney H. Bonck
Attorney, Agent, or Firm—Ken C. Decker; William N. Antonis

[57] ABSTRACT

A clutch drive (10) includes a spindle (16) mounting a driving member (94) and a driven member (118) for rotation about the spindle (16). The driving member (94) includes a pressure plate (96) which moves axially along the spindle to engage and disengage from the driven member (118). The pressure plate (96) is mounted on circumferentially spaced pins (102) which are slidably received in apertures (106) in the pressure plate (96). Springs (112) circumscribe the pins (102) and yieldably urge the pressure plate (96) into driving engagement with the driven member (118). A fluid pressure responsive piston (52) is connected to the pressure plate (96) by a bearing (68) and urges the pressure plate (96) away from the driven member (118). A spring (76) wraps around the spindle (16) and includes tabs (78, 80) engaging a fixed portion of the spindle and a collar (86) fixed to the bearing (68) to prevent rotation of the inner race (66) of the bearing (68) while collapsing to accommodate axial movement of the pressure plate (96).

9 Claims, 4 Drawing Figures

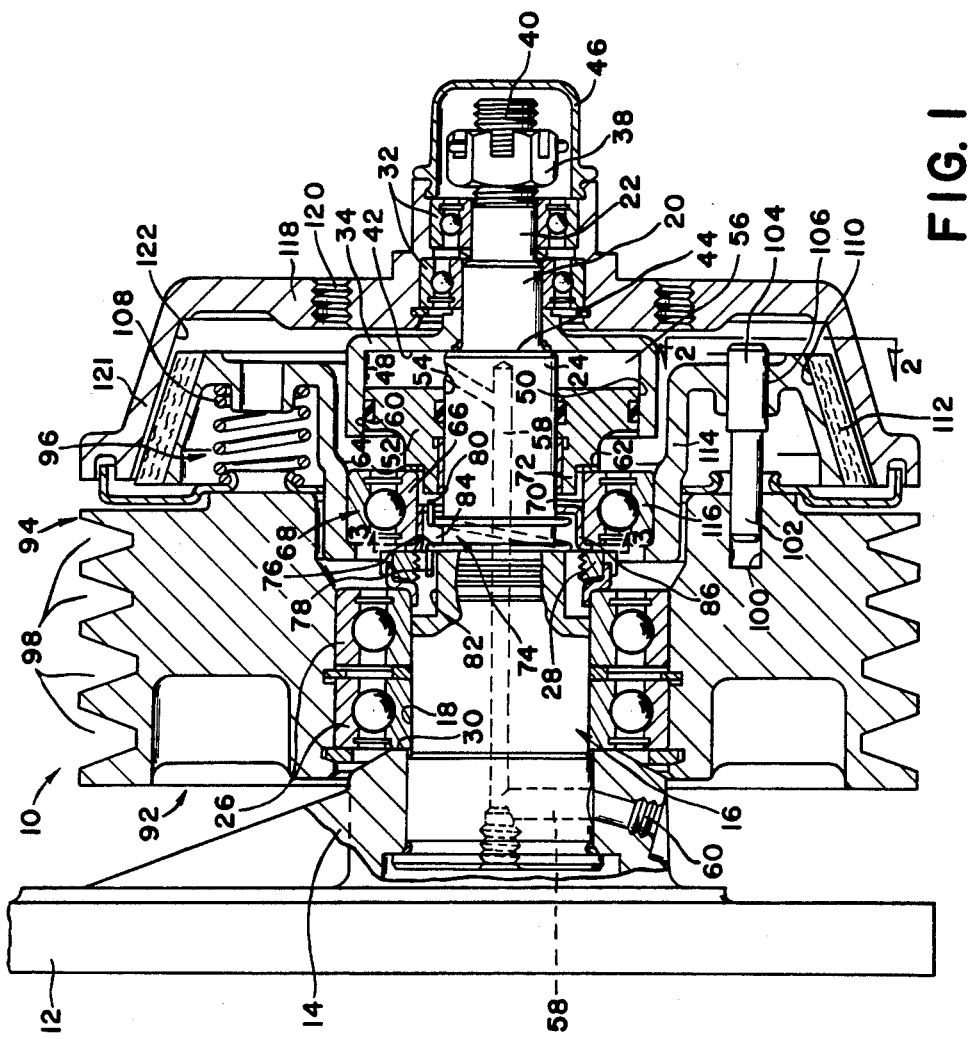

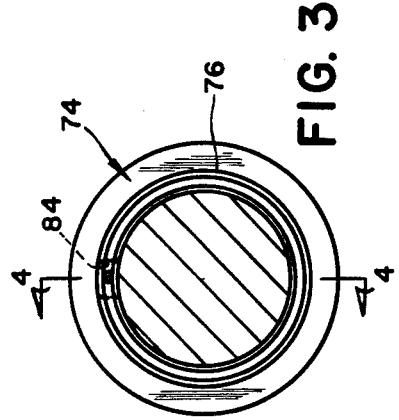
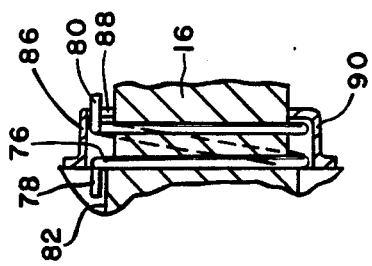
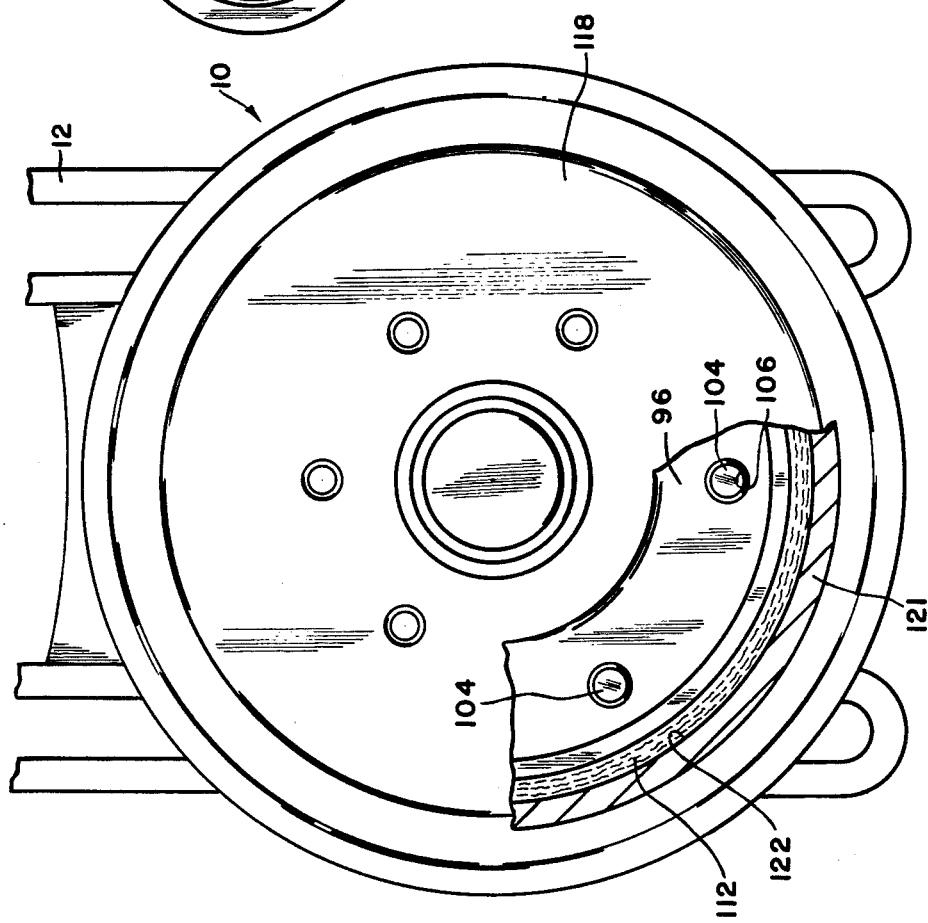

4,541,516

CLUTCH DRIVE WITH ANTIROTATION SPRING

This invention relates to a fan clutch drive for a vehicle engine.

Modern heavy-duty vehicles are equipped with engine cooling fans that consume a significant portion of the power produced by the engine. However, the cooling effect of these fans is needed only during a relatively brief percentage of the time that the engine is operated. Accordingly, substantial savings can be effected by connecting the fan for powered rotation by the vehicle engine only when its cooling effect is necessary. Prior art clutching devices of this type are illustrated in U.S. Pat. No. 3,985,214 issued Oct. 12, 1976 to Hall et al. These devices comprise a spindle having an axis, a driving member and a driven member mounted for rotation about the axis of the spindle, a fluid pressure responsive piston slidable on said spindle in response to fluid pressure supplied to the piston for effecting engagement and disengagement of the driving and driven members to effect a driving connection between the driving and driven members when said members are engaged and to break said driving connection when the members are disengaged, one of said members including a portion movable parallel to the axis of said spindle in response to movement of said piston, resilient means yieldably urging said parallel movable portion into driving engagement with said other member, and bearing means movable axially along said spindle with said parallel movable member and having rotative and non-rotative components for providing a connection between the piston and said parallel movable portion.

Unless such prior art devices were carefully designed, they lacked durability because the pressure responsive means, which is usually a pressure responsive piston, must support the weight of the fan plate and fan. Accordingly, because of the weight that must be supported by the pressure responsive piston, the piston tends to bellmouth or otherwise deform after a number of engagement and disengagement cycles, so that the cluth assembly tends to leak the pressurized actuating fluid. Furthermore, because of the weight supported by the piston, the seals which seal the piston against the spindle wear out prematurely. Wear of the seals is accelerated in some designs because the piston supports a rotating component which tends to rotate the piston due to the fact that the race of the bearing supporting the rotating component tends to rotate unless locked against rotation. In any event, the pressurized actuating fluid leaks and the clutch therefore fails. The present invention provides a clutch design in which the pressure responsive piston moves only a pressure plate into and out of engagement with the fan plate and does not support the weight of the pressure plate or the fan. Although a bearing is provided to provide a rotary connection between the pressure plate and the piston, the bearing does not support the weight of the pressure plate when the clutch is engaged. A spring resists rotation of the bearing race which bears against the piston. The spring collapses to accommodate axial movement of the pressure plate. The primary advantage of this arrangement is that the clutch is much more durable than the prior art clutches. Accordingly, the present invention is characterized in that the non-rotative component of the bearing means and spindle are interconnected by spring means which yields to accommodate axial movement of the bearing means along the spindle and resists rotation of the non-rotative portion of the bearing means to prevent relative rotation between the non-rotative portion of the bearing means and the pisiton.

Other features and advantages of the invention will become apparent in view of the accompanying description with reference to the accompanying drawings, in which:

FIG. 1 is a view, partially in transverse cross-section, of a clutch drive made pursuant to the teachings of our present invention;

FIG. 2 is a side elevation view of the clutch drive illustrated in FIG. 1, partly in cross-section taken substantially along lines 2—2 of FIG. 1;

FIG. 3 is a cross-sectional view taken substantially along lines 3—3 of FIG. 1; and FIG. 4 is a cross-sectional view taken substantially along lines 4—4 of FIG. 3.

Referring now to the drawings, a clutch drive generally indicated by the numeral 10 includes a support bracket 12 which is rigidly attached to a non-rotative portion of the vehicle adjacent the vehicle engine. The support bracket 12 includes a projecting portion 14 which mounts a spindle generally indicated by the numeral 16. The spindle is stepped to define a larger diameter portion 18, smaller diameter portions 20, 22 and a portion of intermediate diameter indicated generally by the numeral 24.

A pair of bearings 26 are mounted on the larger diameter portion 18 of the spindle 16 and are locked against axial movement by a lock nut 28 which threadedly engages the portion 18 of the spindle 16 and clamps the bearings 26 against axial movement by holding them against the front face 30 of the projecting portion 14 of bracket 12. Another pair of bearings 32 are mounted on the smaller portions 20, 22 of the spindle 16. An annular cylindrical member 34 is also mounted on the smaller portion 20 of the spindle 16. The cylindrical member 34 and the bearings 32 are clamped against axial movement by a nut 38 which is screwed onto threaded portion 40 of the spindle 16 and which holds the cylindrical member 34 and the bearings 32 against one another and holds the inner radially extending face 42 of cylindrical member 34 against a shoulder 44 defined between the portions 20 and 24 of the spindle 16. A removable cap 46 protects the nut 38 and the spindle 16 against environmental contaminants.

The cylindrical member 34 defines an inner cylindrical surface 48 which slidably receives the outer circumferential surface 50 of an annular piston 52. The piston 52 defines an inner circumferential surface 54 which is slidably mounted on the portion 24 of the spindle 16. The piston 52 cooperates with the cylindrical member 34 to define a variable volume chamber 56 therebetween. Fluid pressure from a suitable source (not shown), such as from the vehicle air brake system, is communicated into the chamber 56 through passages generally indicated by the numeral 58 which extend through the spindle 16 to operate the piston 52. The passages 58 terminate in a fitting 60 to provide a connection with the aforementioned fluid pressure source.

The piston 52 is stepped as at 62 to define a radially extending face which receives a washer 64. The washer 64 is disposed between the face 62 and the front face of the inner race 66 of a bearing generally indicated by the numeral 68. The inner circumferential surface 70 of the race 66 is of a diameter larger than the surface 72 on the piston 52 and is also larger than the diameter of the portion 24 of the spindle 16 so that a gap is defined between the inner race 66 and the portion 72 of the piston 52 and the portion 24 of the spindle 16. Accordingly, while movement of the piston 52 will be transmitted to the bearing 78 through the washer 64, the piston 52 does not support the weight of the bearing 68.

The inner race 66 of the bearing 68 is held against rotation relative to the spindle 16 and piston 52 by anti-rotation mechanism generally indicated by the numeral 74. The mechanism 74 includes a coiled spring generally indicated by the numeral 76, the coils of which are wrapped around the spindle 16. The end coils of the coiled spring 76 terminate in axially extending tabs 78, 80. The tab 78 is recieved within a notch 82 provided in the lock nut 28 and the tab 80 is received within a notch 84 in a collar generally indicated by the numeral 86. The collar 86 has an axially countersunk saddle 88 in which the notch 84 is defined. Collar 86 further includes an axially extending portion 90 which is pressed against the inner circumferential surface 70 of the inner race 66 of the bearing 68.

A pulley hub generally indicated by the numeral 92 is mounted on the bearings 26 for rotation about the spindle 16. The pulley hub 92 is an axially fixed portion of a driving member generally indicated by the numeral 94 which consists of the pulley hub 92 and a pressure plate generally indicated by the numeral 96. The pressure plate 96 is an axially movable portion of the driving member 94 and, as will be described hereinafter, is mounted for movement parallel to the axis of the spindle 16. The pulley hub 92 is provided with pulley faces 98 which are adapted to receive belts connecting the pulley hub 92 with the engine crankshaft so that rotation of the crankshaft turns the driving member 94. The pulley hub 92 is also provided with circumferentially spaced bores 100 which are spaced equally about the pulley hub 92 at a predetermined radius from the axis of the spindle 16. The bores 100 receive circumferentially spaced pins 102 which are force fitted into the bores 100. The ends of the pins 102 are provided with an enlarged portion 104 which are slidably received in circumferentially spaced apertures 106 in the pressure plate 96. Circumferentially spaced coiled springs 108 between pulley hub 92 and pressure plate 96 yieldably urge the pressure plate 96 to the right viewing FIG. 1. The pressure plate 96 further includes a tapered portion defining a conical surface 110. A conical band of friction material 112 is secured to the surface 110. The pressure plate 96 further includes an axially extending portion 114 which is secured to the outer race 116 of the bearing 68.

The bearings 32 mount a fan plate 118 for rotation about the spindle 16. The engine cooling fan (not shown) is secured to the fan plate 118 by bolts (not shown) threaded into threaded apertures 120 in the fan plate 118. The fan plate 118 terminates in a conical portion 121 which defines a conical engagement surface 122 which is engaged by the friction material 112 when the clutch is engaged to provide a driving connection between the driving member 94 and the driven member or fan plate 118.

In operation, springs 108 yieldably urge the pressure plate 96 to the right viewing FIG. 1 such that the friction material 112 frictionally engages the surface 122 on the fan plate 118 so that a driving connection is provided between the driving member 94 and the driven member or fan plate 118. Accordingly, the vehicle engine turns the fan to provide engine cooling. However, when a conventional temperature sensor (not shown) senses that the cooling effect of the fan is no longer necessary, a valve mechanism (not shown) is actuated to communicate fluid pressure to the fitting 60. The temperature sensor and valve mechanism may be of the type generally shown in U.S. Pat. No. 4,283,009, issued Aug. 11, 1981 to Deem.

Fluid pressure communicated to the fitting 60 is communicated into the chamber 56 through the passages 58. Fluid pressure in the chamber 56 acts upon the piston 52, urging the latter to the left viewing FIG. 1. Because of the engagement of the shoulder 62 and washer 64 with the inner race 66 of the bearing 68 which is mounted on the pressure plate 96, movement of the piston 52 also urges the pressure plate 96 to the left viewing FIG. 1, thereby breaking the driving connection between the friction material 112 and the surface 122. Accordingly, while the pulley hub 92 will continue to be turned by the vehicle engine, the fan will be disconnected, so that the power used to turn the fan may be saved. When the cooling effect of the fan is again needed, the aforementioned temperature sensor and valve vent the fitting 60 to thereby vent the chamber 56, permitting the springs 108 to again urge the pressure plate 96 and the piston 52 to the right viewing the figure, thereby re-engaging the friction material 112 with the surface 122 to again provide a driving connection between the pulley hub 92 and the fan plate 118. Of course, in case of malfunction such that fluid pressure for some reason is not available, the springs 108 will maintain the clutch members engaged, so that the clutch is "fail-safe". It will also be noted that, because the pressure plate 96 is supported on the pins 102 and that the bearing 68 is attached to the pressure plate 96, the weight of the pressure plate is not borne by the bearing 68 or the piston 52, so that repeated operation of the fan will not cause the piston 52 to deform and will not cause the seals sealing the piston against the cylindrical member 34 and against the spindle 16 to fail prematurely.

It will also be noted that the inner race 66 of the bearing 68 is prevented from rotation by the aforementioned anti-rotation mechanism 74. Without the mechanism 74, the inner race 66 would tend to rotate with the pressure plate, and, because of the engagement of the inner race 66 with the piston 52, rotation of the inner race would also tend to rotate the piston 52 on the spindle 16, thereby perhaps causing the O ring seals to fail prematurely. Such rotation of the piston 52 is prevented by the anti-rotation mechanism 74. The spring 76 collapses to accommodate axial movement of the pressure plate 92.

I claim:

1. Clutch drive comprising a spindle having an axis, a driving member and a driven member mounted for rotation about the axis of said spindle, a fluid pressure responsive piston slidable on said spindle in response to fluid pressure supplied to the piston for effecting engagement and disengagement of the driving and driven members to effect a driving connection between the driving and driven members when said members are engaged and to break said driving connection when the members are disengaged, one of said members including a portion movable parallel to the axis of said spindle in response to movement of said piston, resilient means yieldably urging said parallel movable portion into driving engagement with said other member, and bearing means movable axially along said spindle with said parallel movable member and having rotative and non-rotative components for providing a connection between the piston and said parallel movable portion, characterized in that said non-rotative component of said bearing means and said spindle are interconnected by spring means which yields to accommodate axial movement of the bearing means along said spindle and resists rotation of the non-rotative component of the bearing means to prevent rotation of the non-rotative portion of the bearing means.

2. Clutch drive as claimed in claim 1, further characterized in that said spring means is a coiled spring wrapped around said spindle.

3. Clutch drive as claimed in claim 2, further characterized in that opposite ends of said spring terminate in tabs for connection with the bearing means and with the spindle.

4. Clutch drive as claimed in claim 3, further characterized in that said one member includes support mechanism supporting said parallel movable member, said piston having a circumferentially extending face, said bearing means being mounted on said parallel movable portion and supported by said support mechanism to define a gap between the non-rotative component of the bearing means and said spindle, at least a portion of the coils of said spring means being received within said gap as the parallel movable portion moves along said spindle toward and away from driving engagement with the other member.

5. Clutch drive as claimed in claim 4, further characterized in that a collar is secured to the non-rotative component of the bearing means, said collar having a countersunk saddle extending into said gap, said saddle having a notch receiving one of said tabs.

6. Clutch drive as claimed in claim 4, further characterized in that said spindle is stepped to define larger and smaller diameter portions, said piston being slidable on said smaller diameter portion, and means on said larger diameter portion for receiving the other of said tabs.

7. Clutch device as claimed in claim 6, further characterized in that a nut is threadedly received on the larger portion of the spindle, said nut having a notch receiving said other tab.

8. Clutch drive as claimed in claim 1, further characterized in that said bearing means defines a circumferentially extending gap with said spindle, a collar is secured to the non-rotative component of the bearing and having a counter sunk saddle extending into said gap, at least a portion of said spring means being received within said saddle.

9. Clutch drive as claimed in claim 8, further characterized in that said saddle includes a notch and said spring means has tab received in said notch.

* * * * *